United States Patent
Lee et al.

(10) Patent No.: US 10,853,979 B2
(45) Date of Patent: Dec. 1, 2020

(54) ELECTRONIC DEVICE AND METHOD FOR DISPLAYING SCREEN THEREOF

(71) Applicant: Samsung Electronics Co., Ltd., Gyeonggi-do (KR)

(72) Inventors: Jaemyoung Lee, Seoul (KR); Nari Kim, Seoul (KR); Youngmi Kim, Seoul (KR); Youngseong Kim, Seoul (KR); Jiyeon Kim, Gyeonggi-do (KR); Hyungmin Kim, Seoul (KR); Seungwook Nam, Gyeonggi-do (KR); Hyosang Bang, Seoul (KR); Sangsu Lee, Daejeon (KR); Youngjay Lee, Gyeonggi-do (KR); Hyunyeul Lee, Seoul (KR); Soeyoun Yim, Seoul (KR); Heekyung Jeon, Seoul (KR); Martin Jung, Seoul (KR); Jinhoon Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 15/895,340

(22) Filed: Feb. 13, 2018

(65) Prior Publication Data

US 2018/0240260 A1    Aug. 23, 2018

(30) Foreign Application Priority Data

Feb. 17, 2017    (KR) .................... 10-2017-0021882

(51) Int. Cl.
*G06F 9/451*      (2018.01)
*G06T 11/60*      (2006.01)
(Continued)

(52) U.S. Cl.
CPC ............ *G06T 11/60* (2013.01); *G06F 3/0481* (2013.01); *G06F 9/451* (2018.02); *G06T 13/80* (2013.01);
(Continued)

(58) Field of Classification Search
None
See application file for complete search history.

(56) References Cited

U.S. PATENT DOCUMENTS 6,374,145 B1 *   4/2002   Lignoul
8,532,596 B1     9/2013   Park
(Continued)

FOREIGN PATENT DOCUMENTS

JP    2014-521174 A    8/2014
KR    10-2010-0104562 A    9/2010
(Continued)

OTHER PUBLICATIONS

Clove Technology, "YotaPhone 2 Review", Dec. 3, 2014, URL: https://www.youtube.com/watch?v=QrVoZ43eF_g (Year: 2014).*
(Continued)

*Primary Examiner* — David H Chu
(74) *Attorney, Agent, or Firm* — Cha & Reiter, LLC

(57) ABSTRACT

An electronic device according to one embodiment of the present disclosure may comprise a display, memory, and at least one processor configured to be connected electrically to the display and the memory. The at least one processor may execute instructions stored in the memory to: display a first screen generated by a first application on the display, provide first attribute information of at least one object included in the first screen to a second application in response to a screen switching event for displaying a second screen generated by the second application, and generate, by the
(Continued)

second application, the second screen including the at least one object based on the first attribute information.

16 Claims, 12 Drawing Sheets

(51) Int. Cl.
  *G06T 13/80* (2011.01)
  *G06F 3/0481* (2013.01)
(52) U.S. Cl.
  CPC ... *G09G 2330/021* (2013.01); *G09G 2340/10* (2013.01); *G09G 2340/12* (2013.01)

(56) References Cited

U.S. PATENT DOCUMENTS

| | | | |
|---|---|---|---|
| 8,717,372 B1 | 5/2014 | Wyatt | |
| 9,182,903 B2* | 11/2015 | Lombardi | G06F 1/3206 |
| 2004/0106438 A1* | 6/2004 | Chen | |
| 2005/0193118 A1* | 9/2005 | Le et al. | |
| 2007/0180509 A1* | 8/2007 | Swartz et al. | |
| 2011/0022958 A1 | 1/2011 | Kang et al. | |
| 2012/0023425 A1 | 1/2012 | Hackborn et al. | |
| 2013/0050224 A1* | 2/2013 | Gehani | G06T 13/80 |
| | | | 345/473 |
| 2013/0063380 A1* | 3/2013 | Wang | G06F 3/04883 |
| | | | 345/173 |
| 2013/0215151 A1* | 8/2013 | Chang | G11B 27/3027 |
| | | | 345/636 |
| 2014/0053109 A1 | 2/2014 | Xu et al. | |
| 2014/0123078 A1* | 5/2014 | Brinda | G06F 21/36 |
| | | | 715/863 |
| 2014/0149943 A1 | 5/2014 | Zhang | |
| 2014/0184471 A1* | 7/2014 | Martynov | G06F 3/1423 |
| | | | 345/1.2 |
| 2015/0033160 A1 | 1/2015 | Xie et al. | |
| 2015/0082255 A1 | 3/2015 | DeVries et al. | |
| 2015/0172539 A1* | 6/2015 | Neglur | H04N 5/23206 |
| | | | 348/207.1 |
| 2015/0185811 A1* | 7/2015 | Connell | G06T 1/60 |
| | | | 345/173 |
| 2015/0277545 A1* | 10/2015 | Flowers | G06F 1/3296 |
| | | | 713/323 |
| 2015/0350814 A1* | 12/2015 | Krochmal | H04L 5/0035 |
| | | | 455/41.2 |
| 2016/0246353 A1* | 8/2016 | Bostick | G06F 1/3231 |
| 2017/0070959 A1* | 3/2017 | Khazanov | H04W 52/0235 |
| 2017/0131778 A1* | 5/2017 | Iyer | G06F 1/1694 |
| 2017/0242622 A1* | 8/2017 | Solbach | G06F 13/20 |
| 2017/0242993 A1* | 8/2017 | Hama | G06F 3/0488 |
| 2018/0075273 A1* | 3/2018 | Vissa | G06F 1/3234 |
| 2018/0159971 A1* | 6/2018 | Yang | G06F 9/44 |
| 2018/0165437 A1* | 6/2018 | Shim | H04W 12/0608 |

FOREIGN PATENT DOCUMENTS

| | | |
|---|---|---|
| KR | 10-2011-0008738 A | 1/2011 |
| KR | 10-1315957 B1 | 10/2013 |
| KR | 10-1449844 B1 | 10/2014 |
| KR | 10-2015-0012296 A | 2/2015 |
| KR | 10-2015-0034828 A | 4/2015 |

OTHER PUBLICATIONS

Android Code Snippets, "android—Get absolute coordinates of a View", Mar. 19, 2016, URL: https://android--code.blogspot.com/2016/03/android-get-absolute-coordinates-of-view.html (Year: 2016).*
https://www.youtube.com/watch?time_continue=122&v=_-xYB9EBTaA&feature=emb_titleDroid Life, "How to: Use Always-on Apps with Android Wear", Jan. 26, 2015, URL: (Year: 2015).*
International Search Report dated May 18, 2018.
European Search Report dated Jan. 20, 2020.

* cited by examiner

ELECTRONIC DEVICE AND METHOD FOR DISPLAYING SCREEN THEREOF

CROSS-REFERENCE TO RELATED APPLICATION(S)

This application is based on and claims priority under 35 U.S.C. § 119 to Korean Patent Application No. 10-2017-0021882, filed on Feb. 17, 2017, in the Korean Intellectual Property Office, the disclosure of which is incorporated by reference herein in its entirety.

BACKGROUND

Field

The present disclosure generally relates to an electronic device and, more particularly, to an electronic device which can display screens on a display, a method for displaying screens on the electronic device, and a recording medium including instructions for performing the method.

Description of Related Art

With recent developments in the mobile communication technology, electronic devices such as mobile devices are easily portable, can freely connect to wired/wireless networks, and can perform various functions. For example, a portable electronic device such as a smartphone and a tablet PC can support various functions such as Internet connection, multimedia content playback, voice calls, text messaging, etc.

To support the above functions, the electronic device can provide various user interfaces. As the number of different user interfaces increase, the convenience and esthetic effects in interaction with the electronic device become more important.

The above information is presented as background information only to assist with an understanding of the present disclosure. No determination has been made, and no assertion is made, as to whether any of the above might be applicable as prior art with regard to the present disclosure.

SUMMARY

Conventional electronic devices can provide various backgrounds when displaying, for example, a home screen. However, conventional electronic devices cannot provide an interactive and continuously visual effect when screens are switched, particularly when the screens are generated by different applications.

An electronic device according to one embodiment of the present disclosure may comprise a display, memory, and at least one processor configured to be connected electrically to the display and the memory. The at least one processor may execute instructions stored in the memory to: display a first screen generated by a first application on the display, provide first attribute information of at least one object included in the first screen for a second application in response to a screen switching event for displaying a second screen generated by the second application, and generate, by the second application, the second screen including the at least one object based on the first attribute information.

A method for displaying a screen in an electronic device according to one embodiment of the present disclosure may comprise: displaying a first screen generated by a first application; providing attribute information of at least one object included in the first screen to a second application in response to detection of a screen switching event for displaying a second screen generated by the second application; and generating, by the second application, the second screen including the at least one object based on the attribute information.

BRIEF DESCRIPTION OF THE DRAWINGS

The above and other aspects, features, and advantages of certain embodiment of the present disclosure will be more apparent from the following description taken in conjunction with the accompanying drawings, in which:

FIG. 4 are views illustrating screens displayed in various operating states according to an embodiment of the present disclosure;

DETAILED DESCRIPTION

Figure 1:
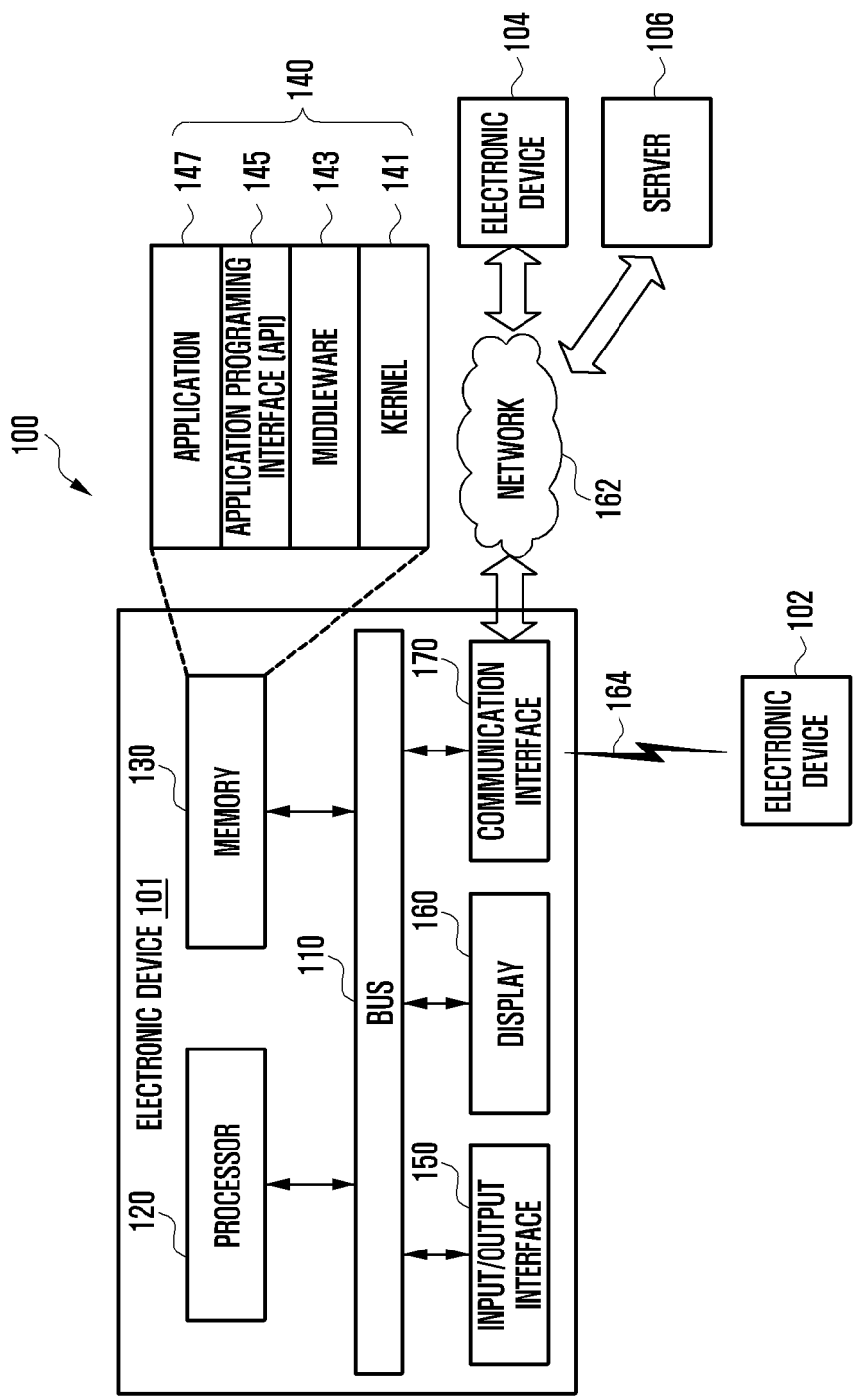
FIG. 1 illustrates an electronic device in a network environment according to an embodiment of the present disclosure.

Hereinafter, various example embodiments of the present disclosure are described in greater detail with reference to the accompanying drawings. While the present disclosure may be embodied in many different forms, specific embodiments of the present disclosure are illustrated in drawings and are described herein in detail, with the understanding that the present disclosure is to be considered as an example of the principles of the disclosure and is not intended to limit the disclosure to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in the disclosure and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

As used herein, the terms "1st" or "first" and "2nd" or "second" may refer to corresponding components without implying an order of importance, and are used merely to distinguish each component from the others without unduly limiting the components. For example, both a first user device and a second user device are user devices and may be different user devices. Thus, a first element may be referred to as a second element without deviating from the scope of the present disclosure, and similarly, a second element may be referred to as a first element.

When it is described that an element is "coupled" to another element, the element may be "directly coupled" to the other element or "electrically" or "indirectly" coupled to the other element through a third element. However, when it is described that an element is "directly coupled" to another element, no intervening element may exist between the element and the other element.

Terms used in the present disclosure are not to limit the present disclosure but to illustrate example embodiments. When using in a description of the present disclosure and the appended claims, the singular form of a term may also refer to the plural unless it is explicitly indicated otherwise.

Unless explicitly defined otherwise, terms such as technical terms and scientific terms used herein have the same meaning as those generally understood by a person of common skill in the art. Further, it should be understood that when applicable, terms should be given their contextual meanings in the relevant art.

In this disclosure, an electronic device may be a device that perform communication functions. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic accessory, or a smart watch), or the like, but is not limited thereto.

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame, or the like, but is not limited thereto.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, or the like, but is not limited thereto.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.), or the like, but is not limited thereto. An electronic device disclosed herein may be one of the above-mentioned devices or any combination thereof. As well understood by those skilled in the art, the above-mentioned electronic devices are examples only and not to be considered as a limitation of this disclosure.

FIG. 1 is a block diagram illustrating an example electronic apparatus in a network environment according to an exemplary embodiment of the present disclosure.

With reference to FIG. 1, the electronic apparatus 101 may include a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit for interconnecting elements described above and for allowing a communication, e.g. by transferring a control message, between the elements described above.

The processor 120 may include various processing circuitry and can receive commands from the above-mentioned other elements, e.g. the memory 130, the input/output interface 150, the display 160, and the communication interface 170, through, for example the bus 110, can decipher the received commands, and perform operations and/or data processing according to the deciphered commands. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 130 can store commands received from the processor 120 and/or other elements, e.g. the input/output interface 150, the display 160, and the communication interface 170, and/or commands and/or data generated by the processor 120 and/or other elements. The memory 130 may include software and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example giving a priority in using a system resource, e.g. the bus 110, the processor 120, and/or the memory 130, of the electronic apparatus 101 to at least one application from among the at least one of the application 147.

The API 145 is an interface through which the application 147 can control a function provided by the kernel 141 and/or the middleware 143, and may include, for example at least one interface or function for file control, window control, image processing, and/or character control.

The input/output interface 150 may include various input/output circuitry and can receive, for example a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 101 and another electronic devices 102 and 104 and/or a server 106. The communication interface 170 can support short range communication protocols 164, e.g. a Wireless Fidelity (WiFi) protocol, a BlueTooth (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 may be a same type and/or different types of electronic apparatus.

Figure 2:
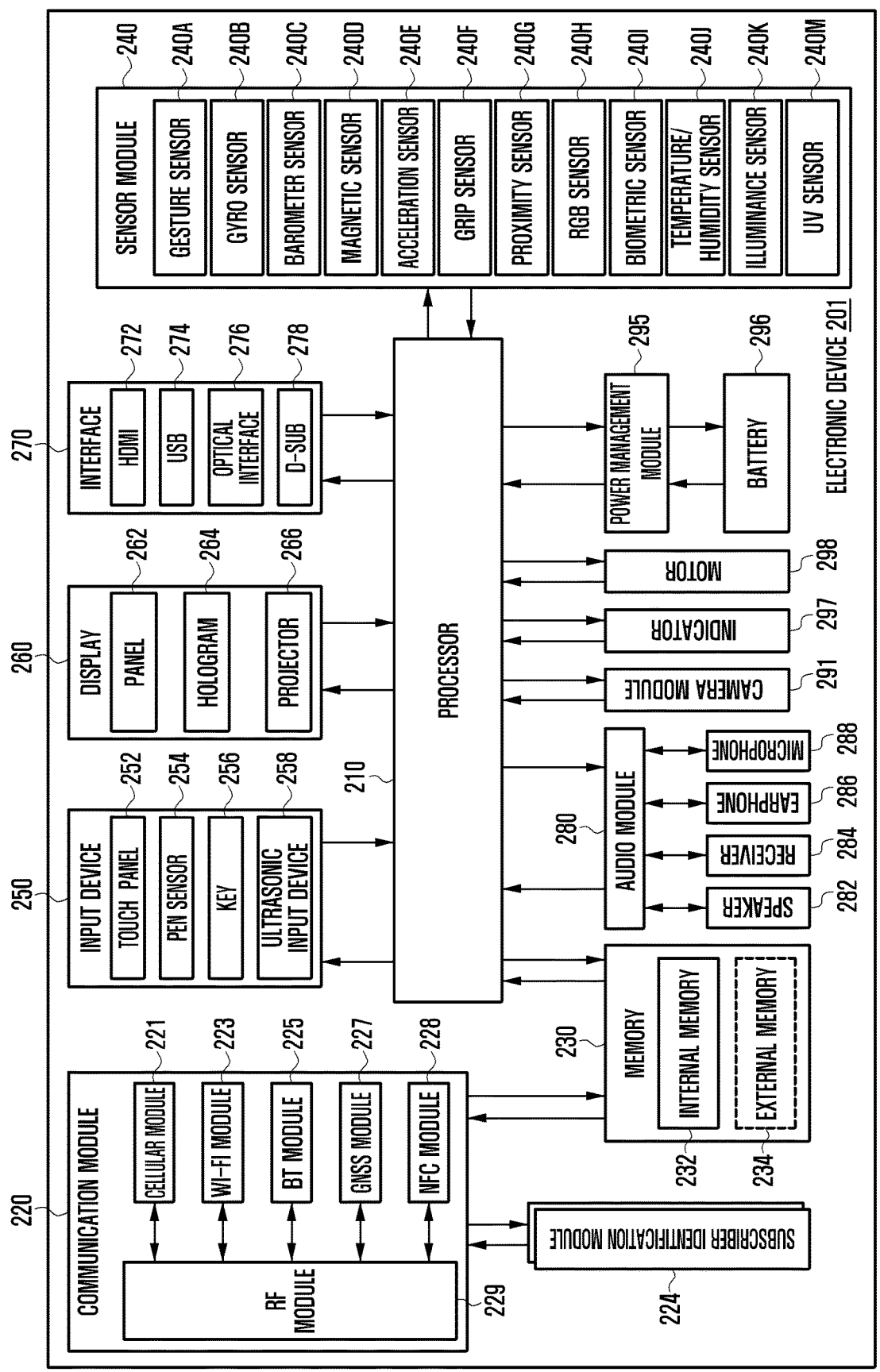
FIG. 2 is a block diagram illustrating a configuration of an electronic device according to an embodiment of the present disclosure.

FIG. 2 is a block diagram illustrating an example electronic device 201 in accordance with an exemplary embodiment of the present disclosure. The electronic device 201 may form, for example the whole or part of the electronic device 101 illustrated in FIG. 1. With reference to FIG. 2, the electronic device 201 may include at least one application processor (AP) (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The AP 210 may include various processing circuitry, and drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 101 (e.g., the electronic device 201) through the network. According to an embodiment, the communication module 220 may include various communication circuitry, such as, for example and without limitation, a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device 201. The SIM card 224 may contain therein an ICCID (Integrated Circuit Card IDentifier) or an IMSI (International Mobile Subscriber Identity).

The memory 230 (e.g., the memory 230) may include an internal memory 232 and/or an external memory 234. The internal memory 232 may include, for example at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 201 through various interfaces. According to an embodiment, the electronic device 201 may further include a storage device or medium such as a hard drive.

The sensor module 240 may measure physical quantity or sense an operating status of the electronic device 201, and then convert measured or sensed information into electric signals. The sensor module 240 may include, for example at least one of a gesture sensor 240A, a gyro sensor 240B, an atmospheric (e.g., barometer) sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination (e.g., illuminance/light) sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input device 250 may include various input circuitry, such as, for example and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (e.g., the display 160) may include a panel 262, a hologram 264, or a projector 266. The panel 262 may be, for example LCD (Liquid Crystal Display), AMOLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include various interface circuitry, such as, for example and without limitation, an HDMI (High-Definition Multimedia Interface) 272, a USB (Universal Serial Bus) 274, an optical interface 276, or a D-sub (D-subminiature) 278. The interface 270 may be contained, for example in the communication interface 170 shown in FIG. 1. Additionally or alternatively, the interface 270 may include, for example an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 201. Although not shown, the power management module 295 may include, for example a PMIC (Power Management Integrated Circuit), a charger IC, or a battery or fuel gauge.

The PMIC may be formed, for example of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer, for example, to a certain unit that includes one of hardware, software and firmware or any combination thereof. The module may be interchangeably used with unit, logic, logical block, component, or circuit, for example. The module may be the entire unit, or part thereof, which performs one or more particular functions. The module may be formed mechanically or electronically. For example, the module disclosed herein may include at least one of a dedicated processor, a CPU, an ASIC (Application-Specific Integrated Circuit) chip, FPGAs (Field-Programmable Gate Arrays), and programmable-logic device, which have been known or are to be developed.

Figure 3:
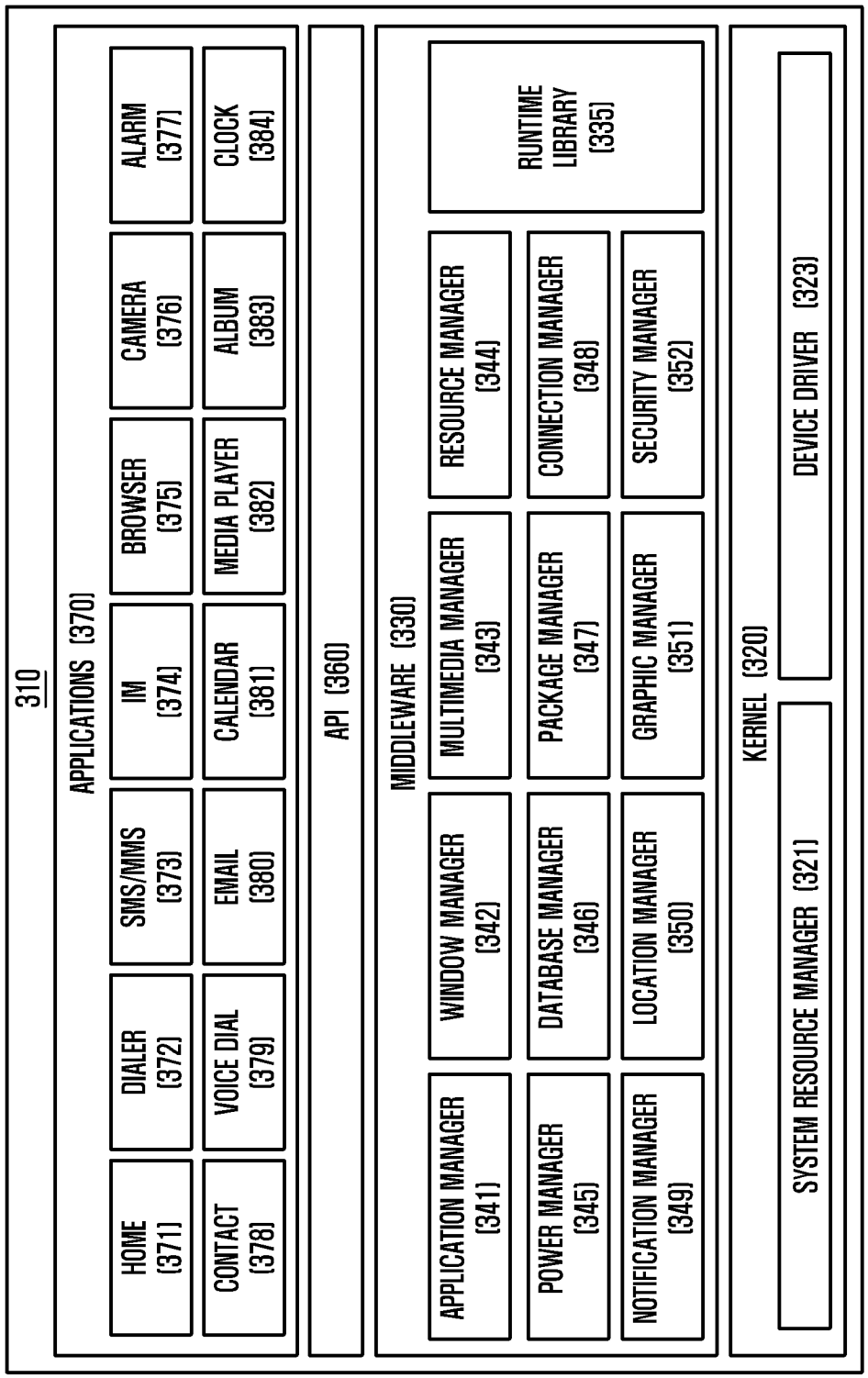
FIG. 3 is a block diagram illustrating a configuration of a program module according to an embodiment of the present disclosure.

FIG. 3 is a block diagram illustrating an example configuration of a programming module 310 according to an exemplary embodiment of the present disclosure.

The programming module 310 may be included (or stored) in the electronic device 201 (e.g., the memory 230) illustrated in FIG. 2 or may be included (or stored) in the electronic device 101 (e.g., the memory 130) illustrated in FIG. 1. At least a part of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be Android, iOS, Windows, Symbian, Tizen, Bada, and the like.

With reference to FIG. 3, the programming module 310 may include a kernel 320, a middleware 330, an API 360, and/or the application 370.

The kernel 320 (e.g., the kernel 141) may include a system resource manager 321 and/or a device driver 323. The system resource manager 321 may include, for example a process manager (not illustrated), a memory manager (not illustrated), and a file system manager (not illustrated). The system resource manager 321 may perform the control, allocation, recovery, and/or the like of system resources. The device driver 323 may include, for example a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an Inter-Process Communication (IPC) driver (not illustrated).

As one of various embodiments of the present disclosure, the display driver may control at least one display driver IC (DDI). The display driver may include the functions for controlling the screen according to the request of the application 370.

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example a life cycle of at least one of the applications 370. The window manager 342 may manage GUI resources used on the screen. For example, when at least two displays 260 are connected, the screen may be differently configured or managed in response to the ratio of the screen or the action of the application 370. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 201) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example one API set may be provided to each platform. In the case of Tizen, for example two or more API sets may be provided to each platform.

The applications 370 (e.g., the applications 147) may include, for example a preloaded application and/or a third party application. The applications 370 (e.g., the applications 147) may include, for example a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the application processor 210), the one or more processors may perform functions corresponding to the instructions. The non-transitory computer-readable storage medium may be, for example the memory 230. At least a part of the programming module 310 may be implemented (e.g., executed) by, for example the one or more processors. At least a part of the programming module 310 may include, for example a module, a program, a routine, a set of instructions, and/or a process for performing one or more functions.

FIG. 4 are views illustrating screens displayed in various operating states according to an embodiment of the present disclosure.

According to one embodiment, an electronic device 400 may be a portable electronic device such as a smart phone. The electronic device 400 can operate in various operating modes (also called operating states), and the operating modes may include a wakeup mode, in which the processor (e.g., application processor) provides various functions and provides various images on the display in support of those functions. The operating modes may also include a sleep mode in which the display may be turned off and the processor waits for a user input.

FIG. 4(*a*) illustrates an always on display (AOD) screen 410. According to one embodiment, the AOD function is performed by the electronic device 400 during its sleep mode.

In the sleep mode, at least one hardware module or software module included in the electronic device 400 may be deactivated, such that minimum power may be supplied to the components of the electronic device to perform only a predetermined function required in the sleep mode. For example, if the electronic device's camera module is switched to the sleep mode, photo and video functions are deactivated. If the processor is switched to the sleep mode, the processing functions of the processor may be limited. Accordingly, during the sleep mode, various functions of the electronic device's hardware modules and/or software modules may be deactivated such that the device's battery life increases.

With the AOD function, the electronic device displays information, such as important information, all the time, regardless of whether it is in sleep mode. To implement AOD, the electronic device may employ low power during the sleep mode. For example, the electronic device 400 can display information such as clock, calendar, weather, remaining battery, missed call, new text message, etc. in the AOD screen 410 in a partial area of a display. In one embodiment, the user may select the desired information to be displayed by entering a user input, such as a swipe gesture in the partial area. Further, according to one embodiment, the electronic device 400 can display at least one object on the AOD screen 410 which is also displayed during the wakeup state of the electronic device in order to improve user experience. The at least one object may include an animation effect, an icon, a widget, etc.

If a specific screen switching event is detected in the screen shown in FIG. 4(*a*), the electronic device 400 may switch to the wakeup mode, and can display a lock screen 420 as shown in FIG. 4 (*b*) or a home screen 430 as shown in FIG. 4 (*c*). Here, the screen switching event may include an event triggered by a user operation such as a touch input, key input, and tilt input for a touch screen. In addition, the screen switching event may include an interrupt event caused by various events such as reception of a short message service (SMS) message or E-mail, a push message reception, call reception, etc.

In the wakeup mode, various hardware modules and/or software modules (e.g., each component of electronic device 101 of FIG. 1 and/or electronic device 201 of FIG. 2) included in the electronic device 400 receive sufficient power from the battery so that they perform their intended functions. For example, in the wakeup mode, the display can express various contents, and the processor can provide various functions of the electronic device 400.

The user can also switch from the lock screen 420 to the home screen 430. When the lock screen 420 is displayed and a specific screen switching event (e.g., touch input, password input, and lock pattern input) is generated, the lock screen 420 can be switched to the home screen 430.

According to one embodiment, the AOD screen 410, lock screen 420, and home screen 430 can be generated individually by different applications. Hereinafter, an application generating the AOD screen 410 is called the first application, an application displaying the lock screen 420 is called the second application, and an application displaying the home screen 430 is called the third application. According to an embodiment, the first application can be executed by a first processor (e.g., display driver IC) capable of being driven in the low-power or sleep mode, and the second application and the third application can be executed by a second processor (e.g., application processor).

According to one embodiment, at least one object may be displayed on the AOD screen 410 while switching to the lock screen 420 or the home screen 430. The at least one object can provide a cinematic effect by dynamically moving during the switching of the various screens. Such a cinematic effect can provide visual continuity when switching from the AOD screen 410 to the lock screen 420 or the home screen 430 and when switching from the lock screen 420 to the home screen 430. Accordingly, various embodiments of the present disclosure can provide a seamless cinematic effect when switching screens.

Figure 5:
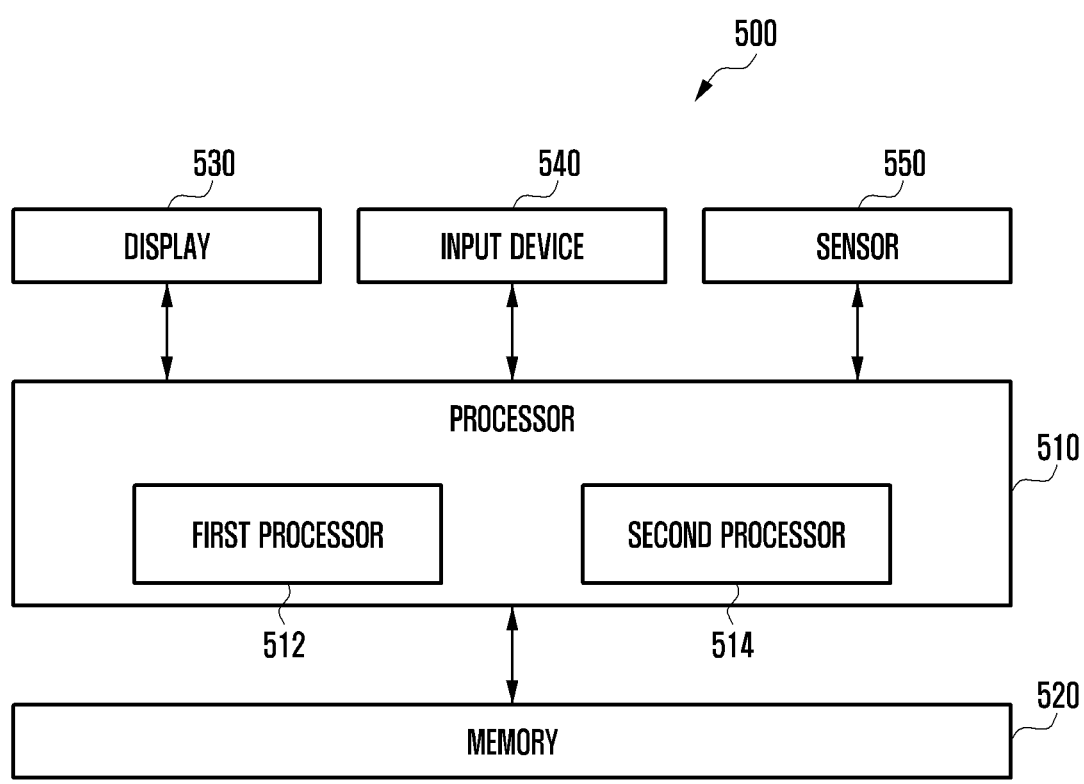
FIG. 5 is a block diagram illustrating a configuration of an electronic device according to an embodiment of the present disclosure.

FIG. 5 is a block diagram illustrating a configuration of an electronic device according to an embodiment of the present disclosure.

As shown in the drawing, the electronic device 500 may include a processor 510, memory 520, display 530, input device 540, and sensor 550. Some of components shown in the drawing may be omitted or replaced with other components. Further, the electronic device 500 may include at least one of the components and/or functions provided by the electronic device 101 of FIG. 1 and/or the electronic device 201 of FIG. 2.

According to one embodiment, the display 530 displays images and may be a liquid crystal display (LCD)), light-emitting diode (LED) display, organic light-emitting diode (OLED) display, micro electro mechanical systems (MEMS) display, electronic paper display, etc. The present disclosure in not limited to the above examples. The display 530 may include at least one of components and/or functions provided by the display 160 of FIG. 1 and/or the display 260 of FIG. 2. According to one embodiment, the memory 520 may include well-known volatile and non-volatile memories, however the present disclosure is not limited thereto. The memory 520 can be connected electrically to the processor 510. The memory 520 may include at least one of components and/or functions provided by the memory 130 of FIG. 1 and/or the memory 230 of FIG. 2.

The memory 520 can store various instructions to be executed by the processor 510. Such instructions may include control commands recognizable by a control circuit such as arithmetic logic operations, data transfers, and inputs/outputs which can be defined in various frameworks and/or program modules stored in the memory 520. Further, the memory 520 can store at least one part of the program module 310 of FIG. 3.

The input device 540 is a component installed on the display 530 for receiving a user input, and may include a touch screen panel (not shown) for receiving a touch input or a hovering input and at least one key (not shown) installed through the housing (not shown) of the electronic device 500. The input device 540 may include at least one of components and/or functions provided by the input device 250 of FIG. 2.

The sensor 550 is a component for detecting an operating state of the electronic device 500, and may include an incline sensor, acceleration sensor, and gravity sensor. The sensor 550 can provide the operating state of the electronic device 500 to the processor 510 by providing the sensed data as electric signals. The sensor 550 may include at least one of components and/or functions provided by the sensor module 240 of FIG. 2.

According to one embodiment, the processor 510 is a component for performing arithmetic operations or data processing related to control and/or communication of each component of the electronic device 500, and may include at least one of components of the processor 120 of FIG. 1 and/or the application processor 210 of FIG. 2. The processor 510 can be connected electrically to internal components of the electronic device 500 such as the display 530, input device 540, sensor 550, and memory 520.

Hereinafter, various embodiments will be described in relation to the electronic device 500 generating various screens (e.g., AOD screen, lock screen, and home screen) by using various applications (e.g., first to third applications), and outputting objects for providing a cinematic effect while generating each screen. However, the arithmetic operation and data processing function performable by the processor 510 is not limited to what is described in the present disclosure. The following operations of the processor 510 can be performed by loading instructions stored in the memory 520.

According to one embodiment, the processor 510 may include at least one of a first processor 512 and a second processor 514. The second processor 514 can control the functions of each component in the electronic device 500 when the electronic device 500 is in its wakeup mode, and the first processor 512 can provide the AOD function when the electronic device 500 is in its sleep mode. The second processor 512 may be an application processor and the first processor 514 may be a display driver IC (DDI).

If the first processor 512 switches to the sleep mode, the second processor 514 may enters an idle state and various components of the electronic device 500 including the second processor 514 may be switched off.

According to one embodiment, the processor 510 (e.g., first processor 512) can generate a first screen (e.g., the AOD screen 410 of FIG. 4) in the sleep mode and display the first screen in the display 530. However, according to another embodiment, if selected by the user, the display 530 may display no information in the sleep mode. In other words, the user may turn off the AOD function. Hereinafter, description will be made by assuming that the AOD function is switched on.

According to one embodiment, the first application is an application for generating the AOD screen, where the AOD screen may include information such as clock, calendar, weather, remaining battery, missed call, new text message, etc. According to an embodiment, the first application can be executed by the first processor 512 in the at least one processor 510.

The first application can generate a first layer including at least one object and at least one other layer different from the first layer. The first screen in turn may be generated by overlaying the first layer and the at least one other layer. For example, the first layer may include a continuously moving object in order to provide a cinematic effect, and the at least one other layer may include the clock provided by the AOD function. According to an embodiment, the object in the first layer may further include icons and/or widgets. In this case, the icons and widgets do not move continuously.

A layer structure of the first screen will be described in more detail with reference to FIG. 7.

The processor 510 can detect a screen switching event when displaying the first screen. Here, the screen switching event may include an event triggered by a user operation such as a touch input, key input, and tilt input for a touch screen. In addition, the screen switching event may include an interrupt event caused by various events such as reception of a short message service (SMS) message or E-mail, a push message reception, call reception, etc.

According to one embodiment, if a screen switching event is detected, the processor 510 can provide attribute information of at least one object included in a first screen for a second application. Here, the second application may be an application for generating a screen (e.g., lock screen 420 of FIG. 4 or home screen 430 of FIG. 4) that is displayed after screen switching. Hereinafter, it is assumed that the second screen switched from the first screen (e.g., AOD screen) is the lock screen.

According to one embodiment, at least one object displayed in the first screen and the second screen can move continuously. Namely, the electronic device 500 can provide a dynamically changing background screen. The attribute information is used for providing the current information (e.g. location and size) of the at least one object to the second application, so that the at least one object can be displayed continuously in the second screen. In addition, the attribute information may include information related to locations of other objects such as the icons and widgets displayed in the first screen. Further, according to an embodiment, the processor can provide for the second application information related to objects (e.g., icon and widget) not being displayed in the second screen among at least one object being displayed in the first screen.

According to one embodiment, the attribute information of an object may include coordinate information of the object. Further, the attribute information may include various kinds of information required for drawing the object so that it is seamlessly displayed from the first screen to the second screen. These kinds of information may include size, shape, and moving speed of the object.

According to another embodiment, the object may change according to the passage of time and may be repeatedly displayed at specific time intervals. For example, the object may change continuously for one minute, and after the expiration of the minute, the object may be reset so that the object is continuously displayed in one-minute loops. In this case, the processor 510 can store object images the specific time interval, provide the images for each application, and provide time information of the object in the previous screen to other applications when switching the screen. An application receiving the time information can sequentially display object images received from the processor 510 for a time period corresponding to the received time information.

According to one embodiment, the processor 510 can control the first application to provide attribute information to a framework in response to detection of a screen switching event and control the framework to provide the attribute information to the second application. According to an embodiment, the attribute information can be transmitted from the first processor 512 executing the first application to the second processor 514 executing the second application.

According to one embodiments, the processor 510 can control the second application to generate the second screen including the at least one object previously displayed by the first application based on the attribute information received from the first application. According to an embodiment, the second application can be executed by the second processor 514 among the at least one processor 510.

According to an embodiment, the second application can generate at least one layer in the background while the first application generates the first screen (e.g., AOD screen). Here, the at least one layer, which is different from the second later explained below, may include a clock widget, and telephone call and camera icons.

If attribute information is received, the second application can generate a second layer based on the attribute information. The second layer may include at least one object of the first layer, where the object is dynamically displayed. The second layer may initially display the object at the same location as when the object was last displayed by the first application, such that when the first screen transitions to the second screen, the movement of the object is seamless.

The second application can generate the second screen by overlaying the pre-generated at least one layer and the second layer. A layer structure of the second screen will be described in more detail with reference to FIG. 8.

According to one embodiments, the processor 510 can detect a screen switching event while displaying the second screen. Here, the screen switching event may include a touch input for releasing the lock state of the electronic device, a password input, and/or a lock pattern input. The processor 510 can transmit attribute information of at least one object included in the second screen in response to the detection of screen switching event to a third application. Here, the third application is an application for generating the home screen, which can be executed by the second processor 514.

The third application can generate a third screen (e.g. the home screen) including the at least one object based on the attribute information and display the third screen in the display 530. A layer structure of the third screen will be described in more detail with reference to FIG. 9.

Figure 6:
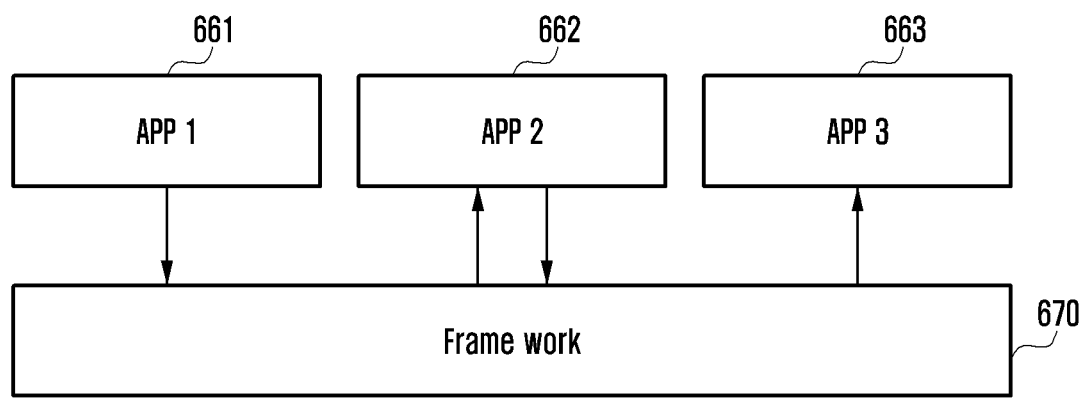
FIG. 6 is a block diagram illustrating provision of attribute information in a software class according to an embodiment of the present disclosure.

FIG. 6 is a block diagram illustrating provision of attribute information in a software class according to an embodiment of the present disclosure.

As shown in the drawing, an electronic device (e.g., electronic device 500 of FIG. 5) can store a plurality of applications (e.g., first application 661, second application 662, and third application 663) and a framework 670 in a memory (e.g., memory 520 of FIG. 5). According to an embodiment, the first application 661 may generate the AOD screen 410 of FIG. 4 and can be executed by a first processor (e.g., first processor 512 of FIG. 5). The second application 662 and the third application 663 may generate respectively the lock screen 420 of FIG. 4 and the home screen 430 of FIG. 4. The second application 662 and the third application 663 may be executed by a second processor (e.g., second processor 514 of FIG. 5).

If a screen switching event is detected while the first screen (e.g., AOD screen) is displayed, the first application 661 can provide attribute information of at least one object included in the first screen to the framework 670, and the framework 670 can identify the second application 662 and provide the attribute information to the second application 662.

The second application 662 can generate the second screen (e.g., lock screen) based on the attribute information, and object may be displayed seamlessly when transitioning from the first screen to the second screen.

If a screen switching event is detected while displaying the second screen, the second application 662 can provide attribute information of the object included in the second screen to the framework 670, and the framework 670 can identify the third application 663 and provide the attribute information to the third application 663.

The third application 663 can generate the third screen (e.g., lock screen) based on the attribute information, and objects may be displayed seamlessly when transitioning from the second screen to the third screen.

Similarly, a screen switching event for switching to the first screen or the second screen may occur while displaying the third screen. In this case, the third application 663 can provide attribute information of the object to the framework 670, and the framework 670 can identify an application for generating the screen after the screen switching event and provide the attribute information to the corresponding application.

Figure 7:
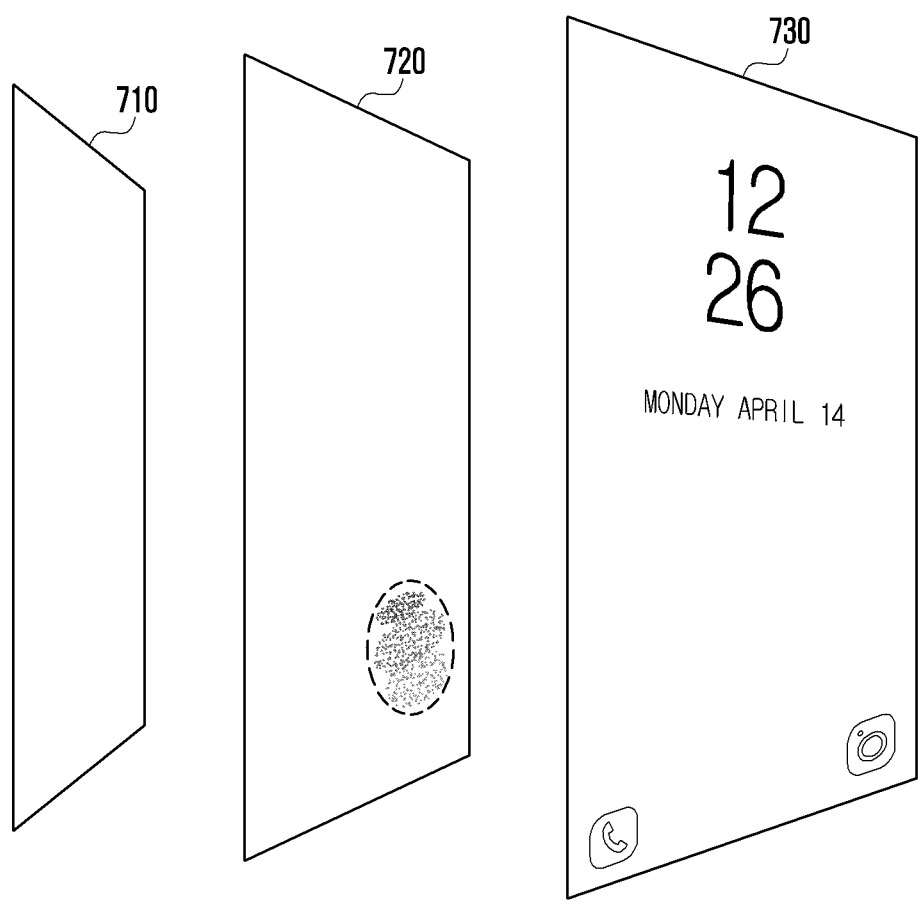
FIG. 7 is a diagram illustrating layers of an always on display (AOD) screen according to an embodiment of the present disclosure.

FIG. 7 is a diagram illustrating layers of an always on display (AOD) screen according to an embodiment of the present disclosure.

According to various embodiments, the first application can generate a first layer 720 including at least one object and at least one other layer (e.g., a layer having a clock).

The first layer 720 may include at least one object that changes continuously (e.g. moving continuously across the display) while the first screen is displayed. The at least one other layer may include a layer display AOD information such as the clock, and a background black layer 710.

Figure 8:
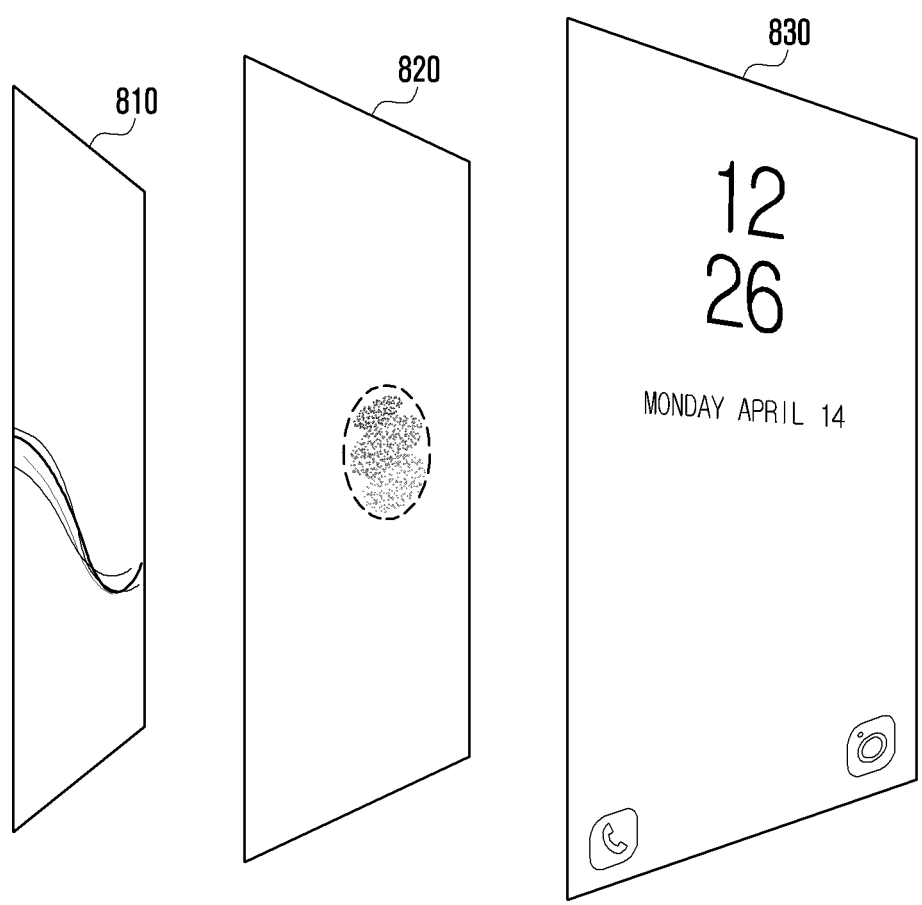
FIG. 8 is a diagram illustrating layers of a lock screen according to an embodiment of the present disclosure.

FIG. 8 is a diagram illustrating layers of a lock screen according to an embodiment of the present disclosure.

According to one embodiment, the second application can generate a second layer 820 including the at least one object and at least one other layer (e.g., a layer displaying a clock, icons, and widgets).

The at least one other layer may include a background layer 810 displaying a static image and an upper layer 830 displaying a clock, icons, and/or widgets.

The second application can generate the second layer 820 including the at least one object based on the attribute information received from the first application. The location and type of the at least one object may be identical to those of the first layer (reference number 720 of FIG. 7) when the second layer 820 is initially generated, and the location and type of the at least one object may change continuously while displaying the second screen.

According to an embodiment, the second application can generate the background layer 810 and the upper layer 830 by operating in the background while the first application displays the first screen. In other words, in this embodiment, the second processor 514 may be active in the sleep mode to execute the second application in the background. Subsequently, if a screen switching event is detected, the second application can generate the second layer 820 based on the attribute information and generate the second screen by combining the background layer 810 and the upper layer 830. Thus, the time required for generating the second screen may be minimized, which may aid in the smooth transition from the first screen to the second screen.

Figure 9:
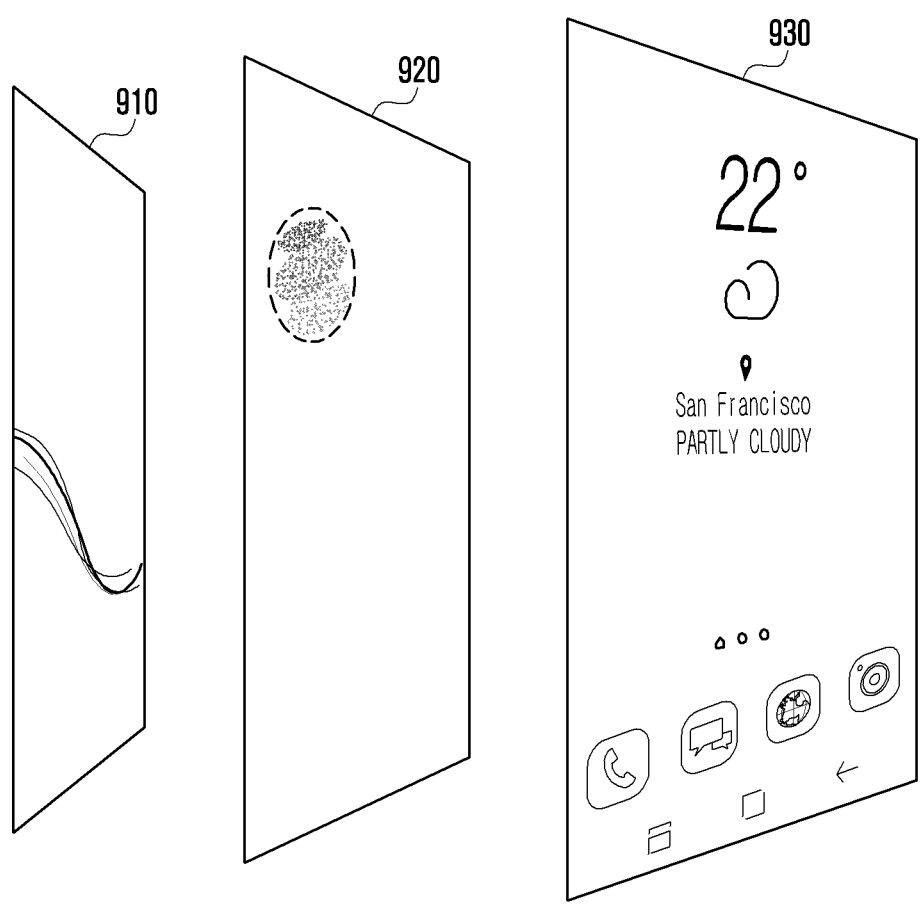
FIG. 9 is a diagram illustrating layers of a home screen according to an embodiment of the present disclosure.

FIG. 9 is a diagram illustrating layers of a home screen according to an embodiment of the present disclosure.

According to one embodiment, the third application can generate a third layer 920 including the at least one object and at least one other layer (e.g., a layer displaying a weather widget and icons).

The at least one other layer may include a background layer 910 displaying a static image and an upper layer 930 including various elements of a home screen such as a weather widget and various home screen icons. Here, the image of the background layer 910 may be identical to the image of the background layer of the lock screen (reference number 810 of FIG. 8), or a different background image can be used if the user so desires.

The third application can generate a third layer 920 including the at least one object based on the attribute information received from the second application. The location and type of the at least one object may be identical to those of the second layer (reference number 820 of FIG. 8) when the third layer 920 is initially generated, and the location and type of the at least one object may change while displaying the third screen.

Figure 10:
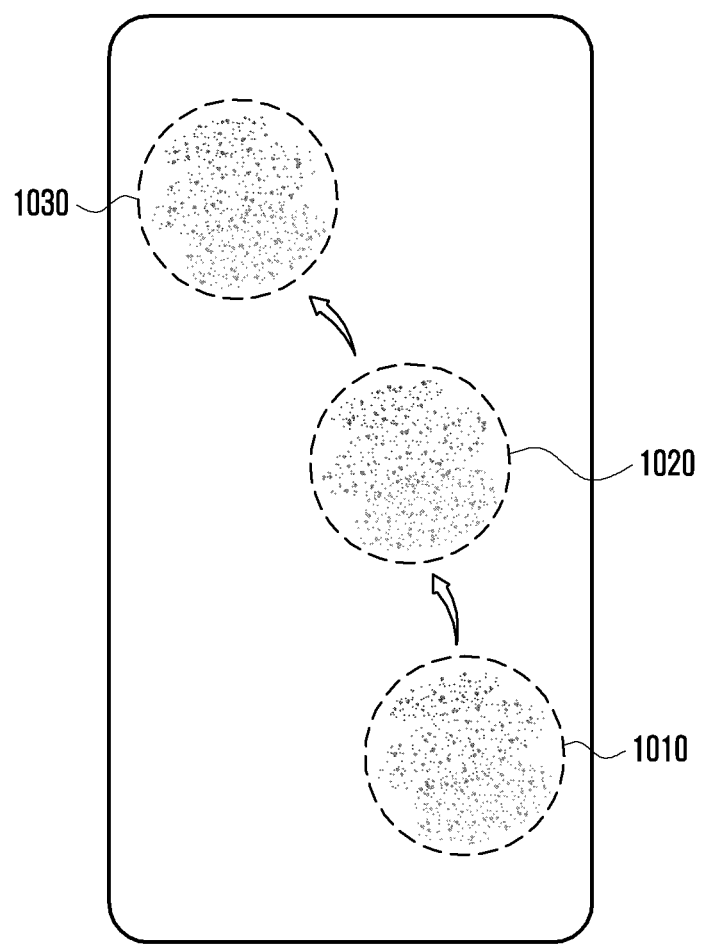
FIG. 10 is a diagram illustrating an exemplary continuously-changing object according to an embodiment of the present disclosure.

FIG. 10 is a diagram illustrating an exemplary continuously-changing object according to an embodiment of the present disclosure.

According to one embodiment, while displaying the first screen, second screen or third screen, a processor (e.g., processor 510 of FIG. 5) can dynamically move the location of at least one object displayed in each screen. For example, the object can move continuously across the display and three locations of the object 1010, 1020, and 1030 are shown in FIG. 10.

The objects may be displayed at a first location 1010 when initially displaying in the first screen, and may move continuously to a second location 1020 and a third location 1030 while the first screen is displayed. Subsequently, the objects may move from the third location 1030 back to the second location 1020 and the first location 1010.

If a screen switching event is generated when the object is at the first location 1010 and when the first screen is displayed, the first application can provide attribute information (e.g., coordinate information) of the object to the second application. The second application can generate a second screen based on the attribute information, and the object may be initially displayed at the first location 1010 and move continuously to the second location 1020 when the second screen is displayed.

If a screen switching event is generated when the object is at the second location 1020 and when the second screen is displayed, the second application can provide attribute information of the object to the third application. The third application can generate a third screen based on the attribute information, and the object may move continuously to the third location 1030 when the third screen is displayed.

As described above, the object can maintain a continuously moving effect when switching between various screens of various applications.

The type of the illustrated object is only one example, and various embodiments of moving objects can be implemented according to the present disclosure.

Figure 11:
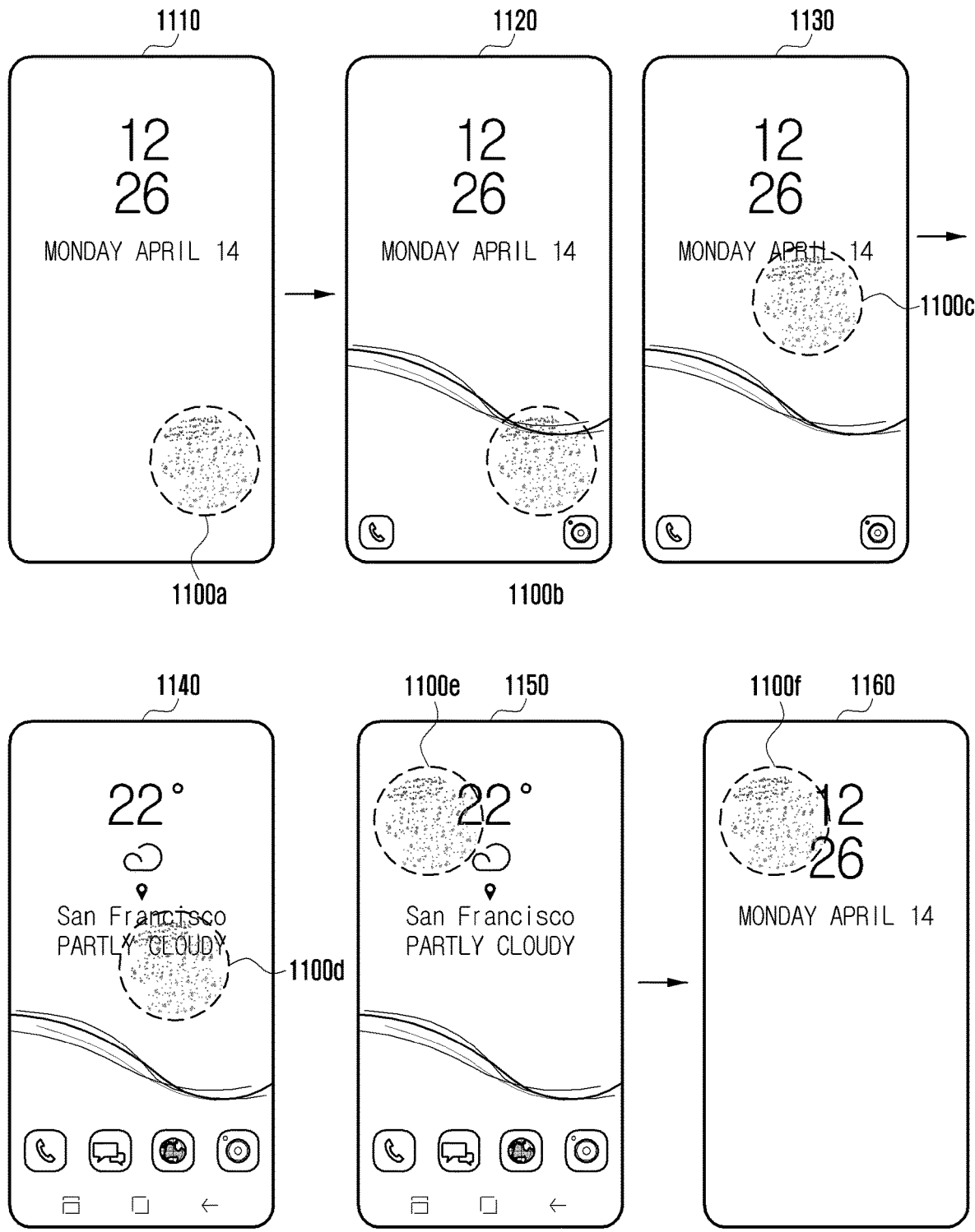
FIG. 11 are diagrams illustrating screens displayed in various operating states according to an embodiment of the present disclosure.

FIG. 11 are diagrams illustrating screens displayed in various operating states according to an embodiment of the present disclosure.

A processor (e.g., processor 510 of FIG. 5) can generate a first screen and display the first screen in a display (e.g., display 530 of FIG. 5). With reference to number 1110, the first screen may include at least one object 1100*a* and a clock image. According to one embodiment, the processor can generate the first screen by combining a first layer including the at least one object 1100*a* and at least one other layer including the clock image.

If a screen switching event is generated when the object is at a first location in the first screen, the processor can provide attribute information of the object to a second application. In this case, the attribute information of the object may include coordinate information of the first location. Further, the attribute information of the object may include information related to icons or widgets that are commonly displayed in the first screen and the second screen.

The processor can control the second application to generate a second screen based on the attribute information. According to one embodiment, the processor can control the second application to generate a second layer including the object and at least one other layer including other user interface elements such as clocks, icons, and background images.

Reference number 1120 illustrates the second screen right after switching from reference number 1110, and an object 1100*b* can be displayed at the first location as shown.

The object may move continuously when the second screen is displayed. With reference to number 1130, an object 1100*c* may move from the first location to a second location.

If a screen switching event is generated when the object is at the second location in the second screen, the processor can provide attribute information of the object to a third application. In this case, the attribute information of object may include coordinate information of the second location.

The processor can control the third application to generate a third screen based on the attribute information. According to one embodiment, the processor can control the third application to generate a third layer including the object and at least one other layer including other user interface elements such as weather widgets and other icons.

Reference number 1140 illustrates a third screen right after switching from reference number 1130, and an object 1100*d* may be displayed at the same second location as shown in reference number 1130.

The object may move continuously when the third screen is displayed. With reference to number 1150, an object 1100e may move from the second location to a third location.

If a screen switching event is generated when the third screen is displayed, the third screen may switch back to the first screen or the second screen. Reference number 1160 illustrates an example that the third screen is switched to the first screen.

If such screen switching event is generated, the processor can provide attribute information of the object to the first application. The first application can configure another first screen based on the attribute information. With reference to number 1160, an object 1100f may be displayed at the same third location as shown in reference number 1150.

FIG. 11 illustrates an exemplary operation of switching between various screens, however various embodiments of the present disclosure are not limited to this example. For example, the screen may be switched from the first screen to the third screen or from the second screen to the first screen. Further, the shapes and locations of the objects are not limited to the examples shown in the drawings.

An electronic device according to one embodiment of the present disclosure may comprise a display, memory, and at least one processor configured to be connected electrically to the display and the memory. The at least one processor may execute instructions stored in the memory to: display a first screen generated by a first application on the display, provide first attribute information of at least one object included in the first screen to a second application in response to a screen switching event for displaying a second screen generated by the second application, and generate, by the second application, the second screen including the at least one object based on the attribute information.

According to one embodiment, the first attribute information may comprise coordinate information of the at least one object included in the first screen.

According to one embodiment, the at least one processor may execute instructions stored in the memory to move a location of the at least one object dynamically while the first screen or the second screen is displayed.

According to one embodiment, the first application can generate a first layer including the at least one object and at least one other layer different from the first layer, and the first screen may be generated by overlaying the first layer and the at least one other layer different from the first layer.

According to one embodiment, the second application may be configured to generate a second layer including the at least one object based on the first attribute information, generate at least one other layer different from the second layer, and generate the second screen by overlaying the second layer and the at least one other layer different from the second layer.

According to one embodiment, the at least one other layer different from the second layer may comprise: a background layer including at least one image and being displayed beneath the second layer; and a foreground layer including a widget and/or an icon and being displayed above the second layer.

According to one embodiment, the at least one processor may execute instructions stored in the memory to: provide the first attribute information to a framework in response to the screen switching event, and control the framework to provide the first attribute information to the second application.

According to one embodiment, the first screen may be an always on display (AOD) screen and the second screen may be a lock screen or a home screen.

According to one embodiment, the at least one processor may include a first processor configured to execute the first application to generate the AOD screen, and a second processor configured to execute the second application to generate the lock screen or the home screen.

According to one embodiment, the at least one processor may execute instructions stored in the memory to provide second attribute information of the at least one object included in the second screen to a third application in response to detection of a screen switching event for displaying a third screen generated by third application while the second screen is displayed. The at least one object may be included in the third screen based on the second attribute information.

According to one embodiment, the second screen may be a lock screen, and the third screen may be a home screen.

According to one embodiment, the object may include at least one of an animation effect, an icon, and a widget.

Figure 12:
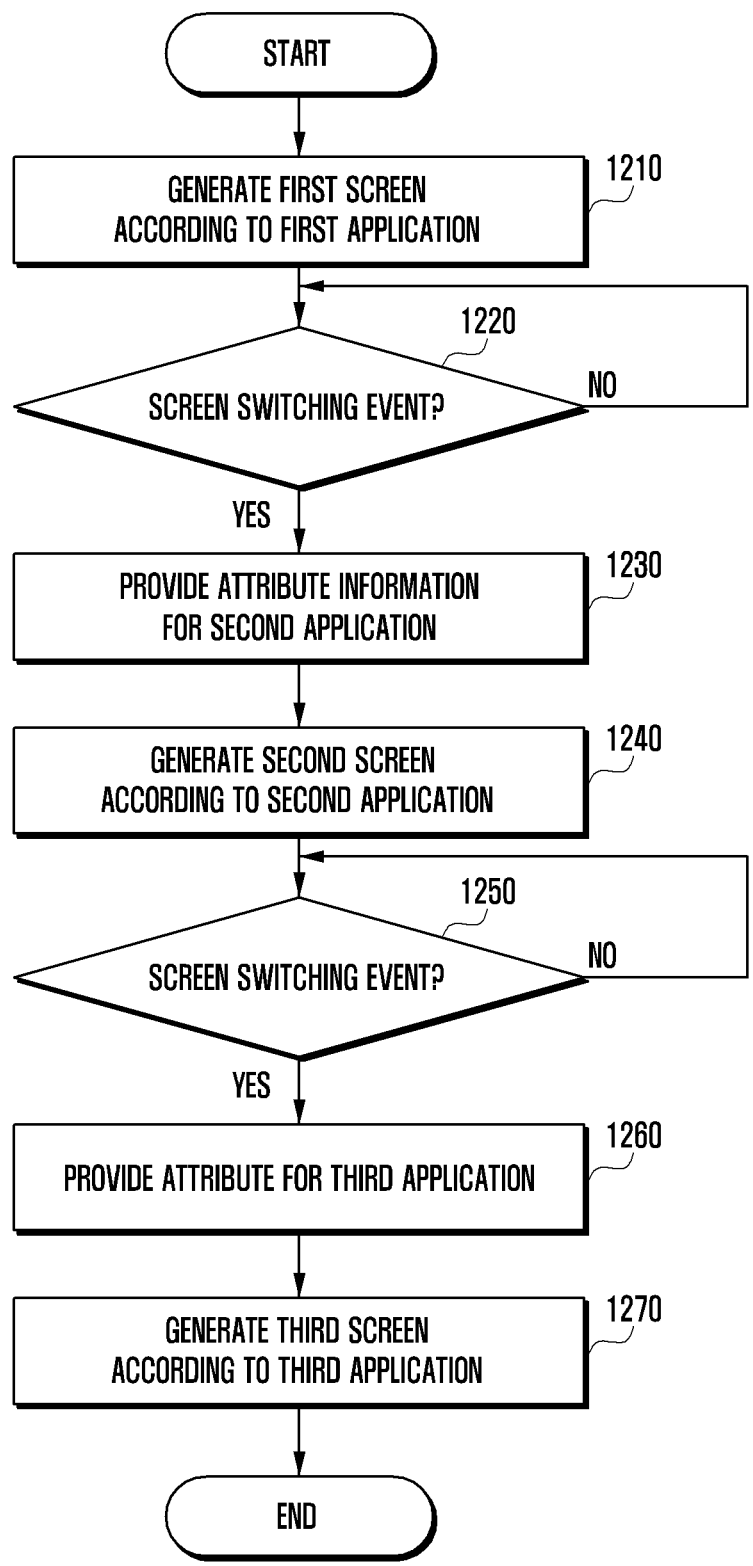
FIG. 12 is a flowchart illustrating a method for providing a screen in an electronic device according to an embodiment of the present disclosure.

FIG. 12 is a flowchart illustrating a method for providing a screen in an electronic device according to an embodiment of the present disclosure.

The method shown in FIG. 12 can be performed by an electronic device described in FIGS. 1 to 11, and hereinafter the aforementioned technical characteristics are omitted.

At operation 1210, the processor controls a first application to generate and display a first screen in a display. According to an embodiment, the first application can be executed by a first processor capable of operating in low power mode, and the first screen may be an AOD screen.

At operation 1220, the processor detects a screen switching event for switching to a second screen.

At operation 1230, the processor provides attribute information of at least one object included in the first screen to a second application in response to detection of the screen switching event. According to an embodiment, the processor can provide the attribute information to a framework, and control the framework to provide the attribute information to the second application.

At operation 1240, the processor controls a second application to generate a second screen based on the attribute information. According to one embodiment, the processor can control the second application to generate a second layer including the object and at least one other layer (e.g., a layer displaying elements such as clocks, icons, and background images). The second screen may be a lock screen.

At operation 1250, the processor detect a screen switching event for switching to a third screen.

At operation 1260, the processor provides attribute information of the object in the second screen to a third application in response to detection of the screen switching event.

At operation 1270, the processor controls the third application to generate a third screen based on the attribute information. According to one embodiments, the processor can control the third application to generate a third layer including the object and at least one other layer (e.g., a layer displaying elements such as weather widgets and icons).

A method for displaying a screen in an electronic device according to one embodiment of the present disclosure may include the operations of: displaying a first screen generated by a first application; providing attribute information of at least one object included in the first screen to a second application in response to detection of a screen switching event for displaying a second screen generated by the second application; and generating, by the second application, the second screen including the at least one object based on the attribute information.

According to one embodiment, the attribute information may include coordinate information of the at least one object included in the first screen.

According to one embodiment, the method may further include moving a location of the at least one object dynamically while the first screen or the second screen is displayed.

According to one embodiment, the first screen may include a first layer including the at least one object and at least one other layer different from the first layer. The first screen may be generated by overlaying the first layer and the at least one other layer different from the first layer.

According to one embodiment, the second screen may include a second layer including the at least one object based on the attribute information and at least one other layer different from the second layer. The second screen may be generated by overlaying the second layer and the at least one other layer different from the second layer.

According to one embodiment, the first screen may be an always on display (AOD) screen and the second screen may be a lock screen or a home screen According to one embodiment, the AOD screen may be generated by a first processor configured to execute the first application, and the lock screen or the home screen may be generated by a second processor different from the first processor and configured to execute the second application.

Various embodiments of the present disclosure include an electronic device which can provide a continuously changing background screen while switching amongst various screens, and a method for providing the continuously changing background screen.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
   a display;
   a first processor configured to be connected electrically to the display; and
   a second processor configured to be connected electrically to the display and the first processor,
   wherein the first processor is configured to:
   display a first screen including a first layer that includes at least one object and a first upper layer including an always on display (AOD) screen on the display, and
   provide first attribute information of the at least one object included in the first layer to the second processor in response to a screen switching event for displaying a second screen, and
   wherein the second processor is configured to:
   generate a second layer including the at least one object based on the first attribute information, and
   display the second screen including the second layer and a second upper layer including a lock screen or a home screen on the display.

2. The electronic device of claim 1, wherein the first attribute information comprises coordinate information of the at least one object included in the first layer.

3. The electronic device of claim 1, wherein a location of the at least one object is dynamically moved while the first screen or the second screen is displayed.

4. The electronic device of claim 1, wherein the first processor is configured to:
   generate, using a first application, the first layer including the at least one object and the first upper layer, and
   generate the first screen by overlaying the first layer and the first upper layer.

5. The electronic device of claim 4, wherein the second processor is configured to:
   generate, using a second application, the second layer including the at least one object based on the first attribute information and the second upper layer, and
   generate the second screen by overlaying the second layer and the second upper layer.

6. The electronic device of claim 5, wherein the second processor is configured to:
   generate the second upper layer including a widget and/or an icon;
   generate a second lower layer including a background image; and
   generate the second screen by overlaying the second upper layer, the second layer and the second lower layer.

7. The electronic device of claim 1, wherein the first processor is configured to:
   provide the first attribute information to a framework in response to the screen switching event, and
   control the framework to provide the first attribute information to a second application.

8. The electronic device of claim 1, wherein the second processor is configured to:
   provide second attribute information of the at least one object included in the second layer to a third application in response to detection of a screen switching event for displaying a third screen generated by the third application while the second screen is displayed, and
   generate, using a third application, a third layer including the at least one object based on the second attribute information.

9. The electronic device of claim 8, wherein the second screen is the lock screen and the third screen is the home screen.

10. The electronic device of claim 1, wherein the object comprises at least one of an animation effect, an icon, and a widget.

11. A method for displaying a screen in an electronic device, the method comprising:

displaying, by a first processor, a first screen including a first layer that includes at least one object and a first upper layer including an always on display (AOD) screen on a display;

providing attribute information of the at least one object included in the first layer to a second processor in response to detection of a screen switching event for displaying a second screen;

generating, by the second processor, a second layer including the at least one object based on the attribute information; and displaying the second screen including the second layer and a second upper layer including a lock screen or a home screen on the display.

12. The method of claim 11, wherein the attribute information comprises coordinate information of the at least one object included in the first layer.

13. The method of claim 11, wherein a location of the at least one object is dynamically moved while the first screen or the second screen is displayed.

14. The method of claim 11, wherein the first screen is generated by overlaying the first layer and the first upper layer.

15. The method of claim 14, wherein the second screen comprises the second upper layer, the second layer and a second lower layer, the second upper layer comprises a widget and/or an icon; and the second lower layer comprises a background image.

16. A non-transitory computer readable recording medium comprising instructions for executing the method of claim 11.

* * * * *